United States Patent [19]

Beals, David C.

[11] Patent Number: 4,955,653
[45] Date of Patent: Sep. 11, 1990

[54] SPIRAL LEAD PLATEN ROBOTIC END EFFECTOR

[75] Inventor: Beals, David C., Poquoson, Va.

[73] Assignee: Administrator, National Aeronautics and Space Administration, Washington, D.C.

[21] Appl. No.: 250,662

[22] Filed: Sep. 28, 1988

[51] Int. Cl.[5] ............................................. B25J 15/08
[52] U.S. Cl. .................................. 294/119.1; 901/38; 901/39
[58] Field of Search ............... 294/119.1, 86.4, 93, 294/103.1, 116; 279/114, 115, 116, 71, 110; 269/233; 901/31, 36-39

[56] References Cited

U.S. PATENT DOCUMENTS

| 82,627 | 9/1868 | Munger | 279/114 |
|---|---|---|---|
| 1,391,908 | 9/1921 | Segler | 279/114 |
| 1,399,786 | 12/1921 | Messenger | 279/114 X |
| 1,772,203 | 8/1930 | Bush | 279/114 |
| 2,399,536 | 3/1946 | Baum | 279/114 |
| 2,598,165 | 5/1952 | Harvey | 279/114 |
| 4,222,577 | 9/1980 | Giffin | 279/114 |
| 4,272,088 | 6/1981 | Perry | 279/114 |
| 4,585,240 | 3/1986 | Giffin | 279/114 X |
| 4,602,799 | 7/1986 | Rohm | 279/114 |
| 4,693,148 | 9/1987 | Lobley | 82/40 R |
| 4,707,013 | 11/1987 | Vranish | 294/119.1 |
| 4,723,806 | 2/1988 | Yuda | 294/119.1 |
| 4,762,357 | 8/1988 | Bergamo | 294/119.1 |
| 4,765,669 | 8/1988 | Meier | 294/119.1 |

FOREIGN PATENT DOCUMENTS 53-18165 2/1978 Japan .

Primary Examiner—Johnny D. Cherry
Attorney, Agent, or Firm—George F. Helfrich; John R. Manning

[57] ABSTRACT

A robotic end effector is disclosed which makes use of a rotating platen (1) with spiral leads (2,3) used to impact lateral motion to gripping fingers (46,48). Actuation is provided by the contact of rolling pins (54,56) with the walls of the leads. The use of the disclosed method of actuation avoids jamming and provides excellent mechanical advantage while remaining light in weight and durable. The entire end effector is compact and easily adapted for attachment to robotic arms currently in use.

1 Claim, 3 Drawing Sheets

SPIRAL LEAD PLATEN ROBOTIC END EFFECTOR

ORIGIN OF THE INVENTION

The invention described herein was made by an employee of the U. S. Government and may be used by or for the Government for governmental purposes without payment of any royalties thereon or therefor.

TECHNICAL FIELD OF THE INVENTON

This invention relates generally to the field of robotics, and more specifically to the mechanism of a general purpose robotic end effector.

BACKGROUND OF THE INVENTION

Robotic end effectors are used to handle a variety of materials in the performance of repetitive tasks and to act as remote manipulators in hazardous or isolated environments. Although the tasks required of these mechanisms are diverse, to varying degrees they share common requirements for precision positioning, computerized control, resistance to jamming, and durability. Additionally, many tasks require a combination of compact size and high gripping forces. Finally, in specialized areas such as space construction, there are high premiums on high strength for weight and high penalties for mechanical failure.

Prior art has attempted to answer these competing demands, but sometimes with unacceptable compromises. For instance, when high gripping forces are obtained, the tendency of the mechanism to jam also rises. Additionally, high forces applied to complicated gear trains or transmission linkages promote wear and ultimately result in positioning errors.

Space applications require designers to coordinate exceptional demands for small size and light weight with those for power and high reliability. The goals for robotic manipulators include having the smallest motor possible coupled with a very strong and simple linkage which has a high mechanical advantage but will not jam under load. It is also desirable to have an end effector which, by the simple expedient of replacing a part or two, can be customized as to rate of motion and mechanical advantage without complete re-design of the mechanism.

Remote control of the gripping function requires the ability to determine the path necessary for the grippers to follow, as well as the ability to precisely position the grippers on the work piece. Both of these tasks, whether pre-programmed or performed interactively, are facilitated by true parallel gripper motion in a single axis of freedom. Many end effectors in present use have grippers which move both axially and radially when actuated. Parallel gripper motion minimizes both programming difficulties and operator errors.

Therefore, an object of the present invention is to provide an end effector mechanism which provides high gripping force through high mechanical advantage, while at the same time being resistant to jamming while under load.

A further object of the present invention is to provide an end effector with true parallel opposed jaw movement so as to provide advantages in programming and positioning over those prior art designs in which the jaws move both radially and axially upon actuation.

A further object of the present invention is to provide an end effector with as small a profile as possible so as to facilitate maneuvering in confined areas.

A further object of the present invention is to provide an end effector with a low probability of mechanical failure for applications such as radiological waste handling and space flight where failure costs are particularly high.

A further object of the present invention is to provide an end effector with a high ratio of grip strength to weight for applications such as space construction which place a premium on weight.

A further object of the present invention is to provide an end effector with highly accurate and repeatable gripper positioning by designing for optimally small clearances and very low operating friction.

A further object of the present invention is to provide an end effector with easily modifiable rate of motion and mechanical advantage characteristics so that it can be easily customized for specific applications.

BRIEF SUMMARY OF THE INVENTION

According to the invention, the foregoing and additional objects are attained by an end effector mechanism utilizing a moving inclined plane in the form of a rotating platen with a spiral lead in the form of a groove in the upper surface thereof to convert rotary motion into linear motion.

Gripping fingers are actuated by contact with the sides of the spiral lead as the platen turns. Because these fingers are mechanically constrained so as to be free to move in only one axis, the rotation of the platen results in linear movement by the grippers.

A means of rotating the platen is included which comprises a motor along with appropriate gearing to modify the rate of rotation and torque applied to the platen by the motor.

All moving parts of the end effector are mounted in a rigid frame, which includes mounting surfaces for attaching the end effector to any standard robotic arm by customary methods.

In the preferred embodiment, the generalized form of the invention is realized as follows:

A pair of spiral grooves which serve as leads to guide the movement of the robotic grippers are machined into the surface of a circular, rotatable platen. These spiral leads are centered around the axis of rotation of the platen and diverge from the center at a constant linear rate. The spirals originate at positions 180 degrees apart, but are substantially identical in form.

A rigid track consisting of a pair of metal rails is positioned over the center of the platen and parallel to the surface thereof. These rails carry two mechanical fingers which are mounted to the rails by precision linear bearings, and these fingers have pins mounted in roller bearings which extend down into the spiral leads.

A high precision harmonic drive gear is mounted to the back of the platen, and by means of a shaft connecting it to an electric motor, rotational motion is imparted to the gears, and then to the platen.

A rigid metal frame holds all parts in alignment, and provides mounting points for attachment to other pieces of robotic equipment.

DETAILED DESCRIPTION OF THE INVENTION

Figure 1:
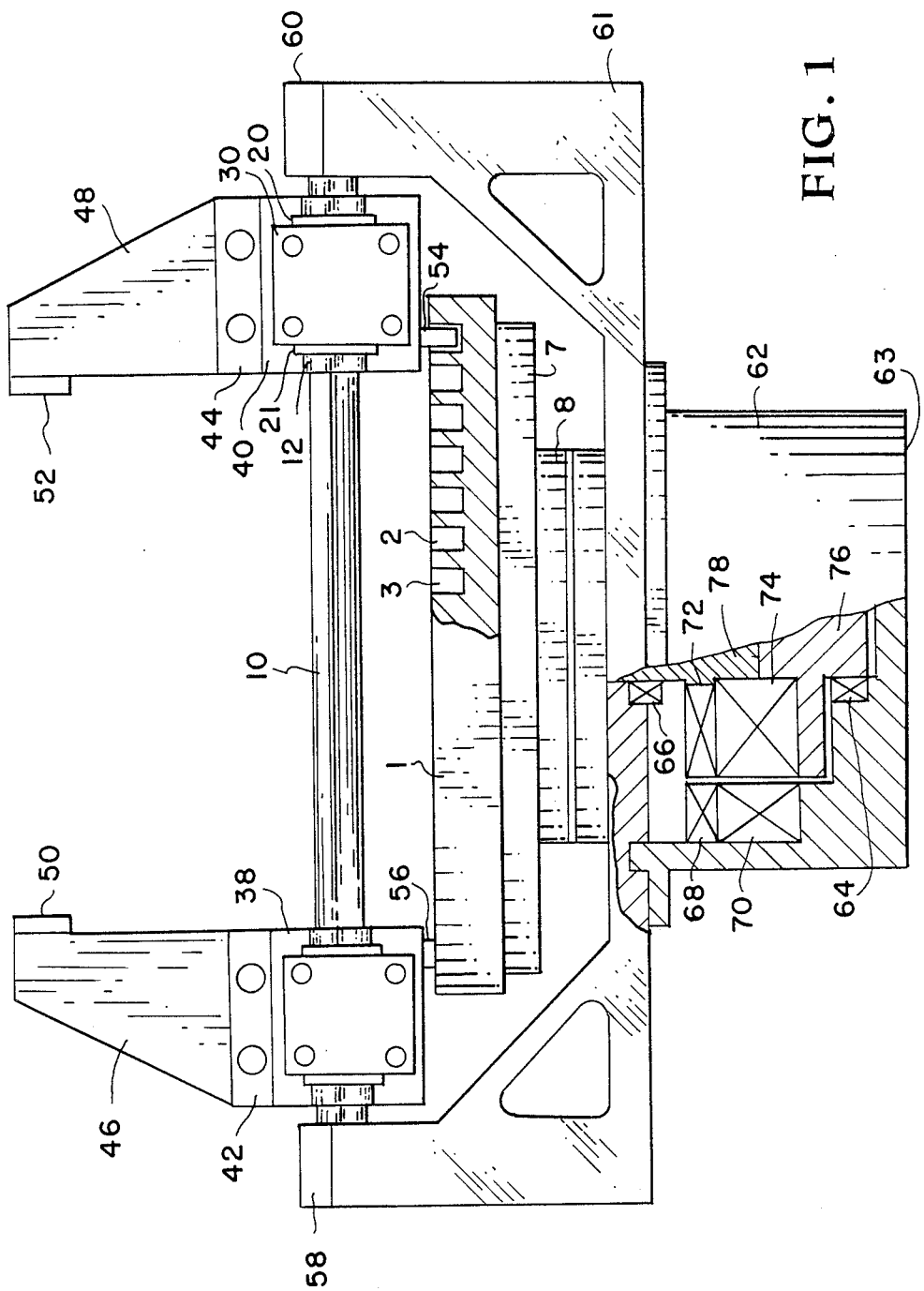
FIG. 1 is a side view of the preferred embodiment of the robotic end effector.
Figure 2:
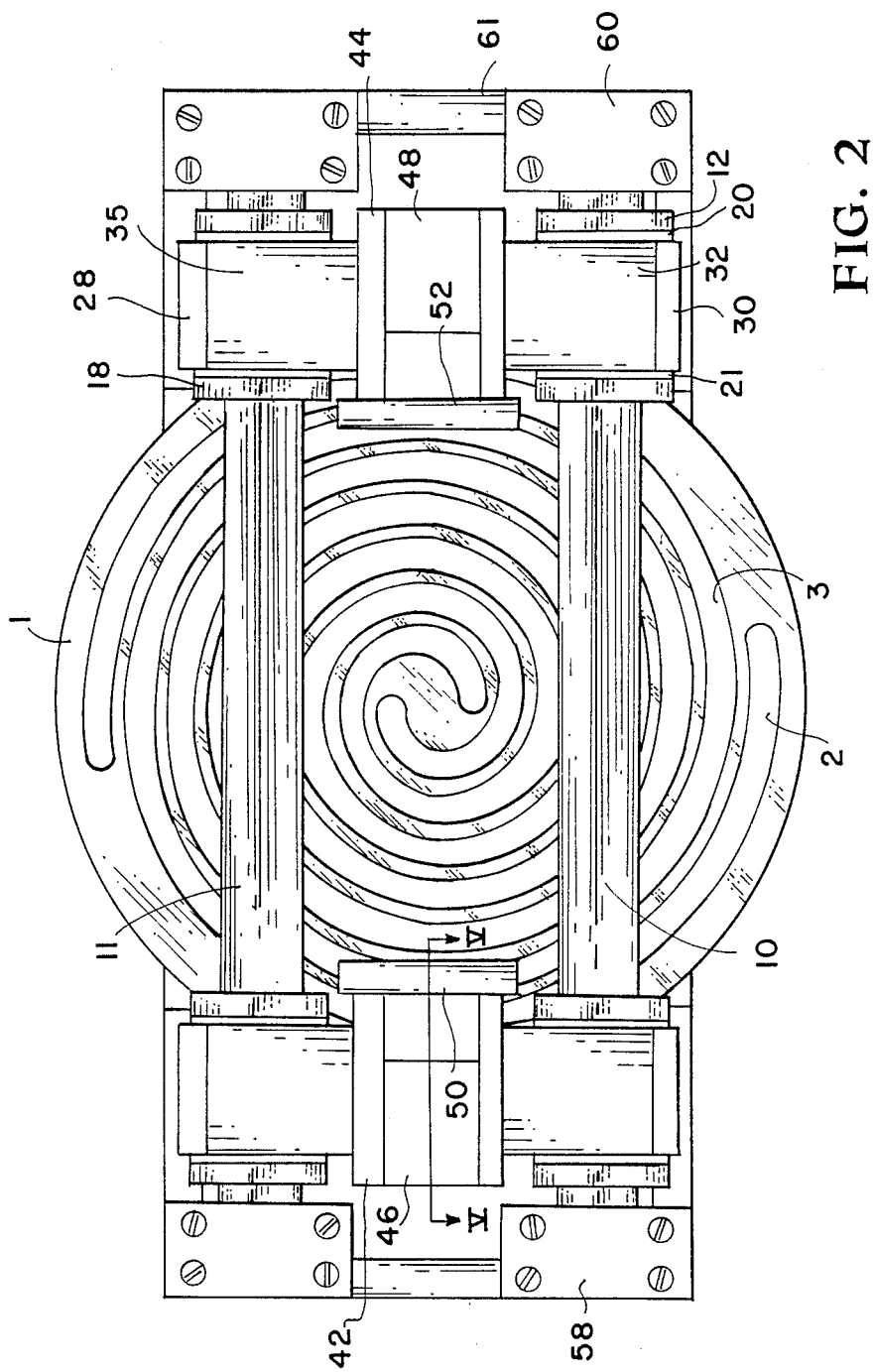
FIG. 2 is a top view of the preferred embodiment of the robotic end effector.

Referring now to FIGS. 1 and 2, the preferred embodiment of the invention is shown to comprise a robotic end effector wherein the opposing gripping surfaces (50,52) derive their action by the engagement of two pins (54,56) with a rotating metal disc (1) hereinafter referred to as the platen. Two spiral grooves (2,3) have been machined in the upper surface of the platen, and form leads which are followed by the grippers as detailed below. The gripping surfaces (50,52) are on the inner faces of two moveable fingers (46,48), which attach by means of mounting brackets (42,44) to moveable carriages (38,40). Each carriage has two linear bearings (12,18) which are held in bearing brackets (32,35) by bearing bracket caps (28,30) and retaining rings (20,21). The linear bearings ride round rails (10,11) which are parallel to each other, parallel to the surface of the rotating platen and spaced laterally at equal distances from the center of rotation of the platen. In this way, the moveable fingers are constrained to move in opposition along straight lines that converge at a point above the center of the platen.

The platen (1) is attached by means of a mounting plate (7) to a gear drive (8). In the preferred embodiment, this gear drive consists of an harmonic reduction gear providing an 80:1 reduction of input rotation to output rotation. The device portrayed is Model #HDUF-20-80, manufactured by the Emhart Machinery Group of Wakefield, Mass. It is a standard item of manufacture which is commercially available in a variety of sizes and reduction ratios. It provides a high reduction in rotational speed with concomitant increase in torque, and it is very strong and durable as well as being manufactured to close dimensional tolerances. Although any number of alternative gear configurations could be used in place of the harmonic drive and still provide a useful reduction in rotational speed, a particular benefit of using harmonic gearing is the impossibility of back driving. Therefore, the gripping surfaces maintain their grip even after the power is turned off to the drive motor. By varying the ratio of reduction in the installed gear drive, or by varying the angle of the spirals, the end effector can be readily customized for specific applications requiring different combinations of grip stength and rapidity of movement.

The reduction gear (8) is driven by a drive shaft (78) which is supported in a bearing (66) and which is attached to a motor shaft (76). The motor shaft is supported by a bearing (64) that is fitted to the motor housing (62). The rotor (74), stator (70), commutator (72) and a brush (68) are shown for the motor. The motor is designed such that by controlling the input power, the number of rotations, and therefore gripper position, can be accurately controlled.

All parts are held in alignment by a frame (61). The frame secures the ends of the parallel rails (10,11) by means of rail caps (58,60) at each end. The gear drive (8) is attached to the upper surface of the frame, and the drive shaft bearing (66) is fitted to the base. The motor housing (62) also attaches to the base of the frame (61), and the lower surface (63) of the motor housing provides a flat mounting surface for attaching the end effector to any sort of mechanical arm which would typically be used to position the end effector when in use.

Figure 3:
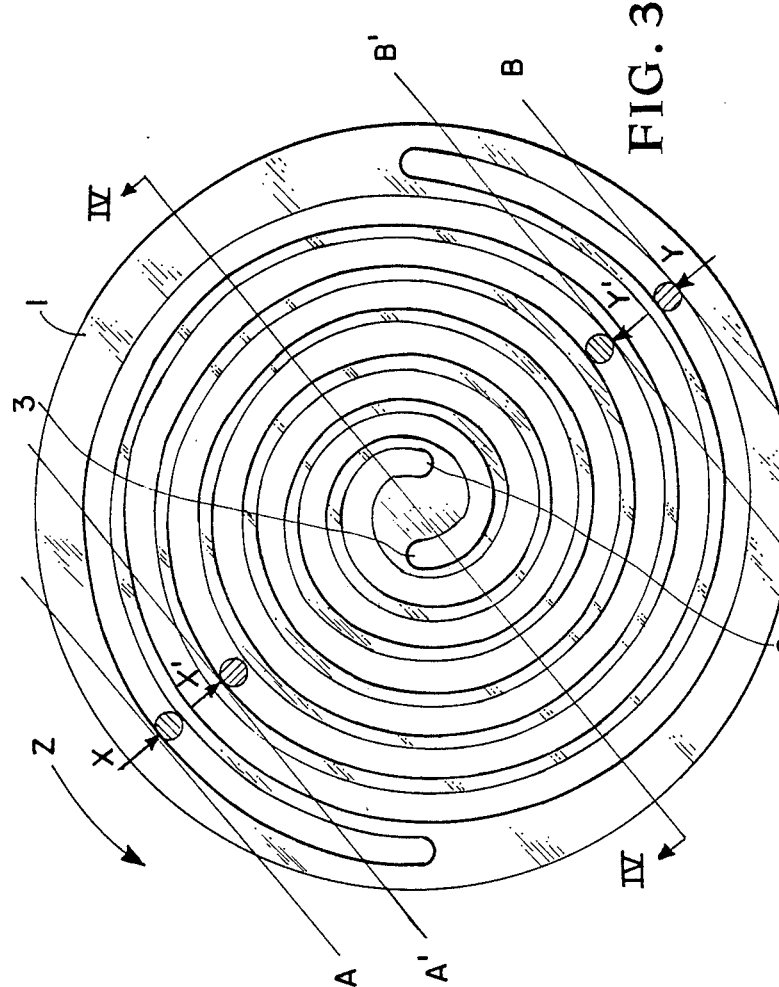
FIG. 3 is a top view of the rotating platen with two spiral leads in the upper surface.

Referring to FIG. 3, note that the leads (2,3) originate opposite the center of rotation of the platen (1) from each other, and diverge at equal linear rates. When the end effector is in operation with the jaws open, the pins (54,56) would engage the platen at the locations marked X and Y. If the platen is rotated 360 degrees about the center in the direction of the arrow (Z), the pins would move inward to the positions marked X' and Y'. The distance moved inward by the gripping surfaces is measured by the distances between lines A & A' and between B & B', respectively. It can be seen that a large movement in rotation of the platen produces a small lateral movement of the grippers, thereby providing a large mechanical advantage and great gripping strength. To ensure accurate repeatability of gripper placement, the positioning and widths of the leads must be carefully controlled.

Figure 4:
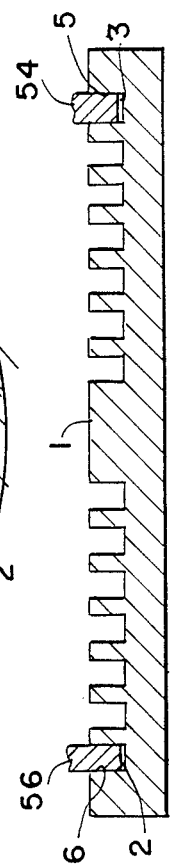
FIG. 4 is a sectional view of the rotating platen taken along line IV—IV of FIG. 3.

FIG. 4 is a sectional view of the rotating platen (1) taken along line IV—IV of FIG. 3. The pins (54,56) are also shown in their engagement with the leads (2,3). As the platen rotates, the advancing vertical walls (5,6) of the two leads are each brought to bear on a pin (54,56), and are thus forced to move radially towards or away from the center of the platen depending on the direction of motion.

Figure 5:
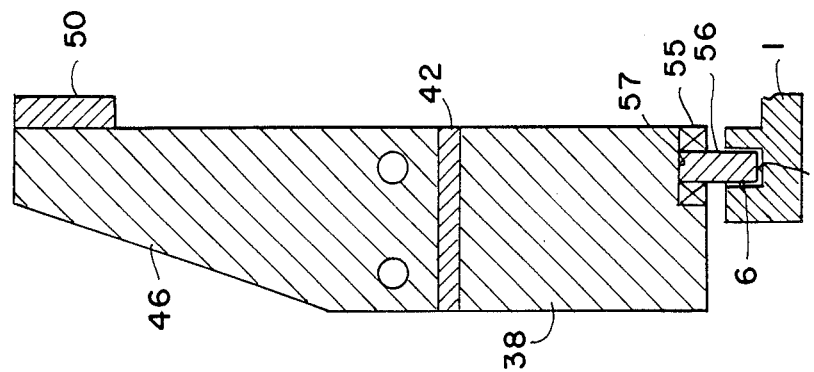
FIG. 5 is a sectional view of one of the moveable finger carriage assemblies taken along line V—V of FIG. 2.

FIG. 5 shows a sectional view taken along line V—V of FIG. 2. It shows one of the moveable grippers (46) with the mounting bracket (42) and carriage (38). The bearing (55) is pressed into a hole (57) in the base of the carriage, and the pin (56) is then pressed into the center of the bearing, allowing the pin to turn. Thus the pin has a low-friction, rolling contact with the wall (6) of the spiral lead (2). The pin is machined to be only very slightly smaller in diameter than the width of the groove in the platen, so that backlash and the resultant positioning errors are kept to a minimum.

The invention can also be practiced in a robotic end effector which has a fixed center post against which a single moveable gripper acts to grasp the workpiece, or in a configuration of more than two moveable grippers moving radially from the center. The rotatable platen can have any number of spiral leads with any variation in depth or wall shape while still retaining the essential mechanical element of force being applied to actuate multiple robotic fingers by an inclined plane formed into the walls of a rotatable spiral groove.

Although specific embodiments of the invention have been described herein, they are to be considered exemplary of the novel features thereof and are not exhaustive. There are obviously many variations and modifications of these specific examples that will be readily apparent to those skilled in the art in light of the above teachings without departing from the spirit or scope of the appended claims. It is, therefore, to be understood that the invention may be practiced otherwise than is specifically described.

What is claimed as new and desired to be secured by Letters Patent of the United States is:

1. A Robotic End Effector for manipulating an object comprising:

a platen in the shape of a disc with a flat upper surface and a flat lower surface and an axis of rotation perpendicular to said upper surface, said upper surface having two spiral leads in the form of a groove formed into said upper surface, said two spiral leads having walls perpendicular to the upper surface of the platen, said two spiral leads being concentric about the axis of rotation, said two spiral leads originating at points on opposite sides and equidistant from said axis of rotation, said two spiral leads diverging from said axis of rotation at substantially equal constant linear rates;

means for rotating the platen about the axis of rotation, said means comprising:

an electric motor adapted for repeated rotation to a pre-determined position, and a gear drive mounted on the lower surface of the platen for transferring rotational force from the motor to the platen and for modifying the rate of rotation of the platen relative to that of the motor;

first and second substantially similar moveable grippers, each of having a base and grasping means and each acting against each other to grasp the object being manipulated, each of said first and second moveable grippers being constrained to move in opposition to each other along a straight track, said straight track being located so as to form an intersection between the axis of rotation of the platen and to extend for an equal distance on both sides of said intersection, said straight track being parallel to the upper surface of the platen, said straight track being formed by a pair of parallel rails to which each of the first and second moveable grippers are attached by means of precision linear bearings;

a means of engaging each of the first and second moveable grippers with a corresponding one of the two spiral leads in the platen, said means of engaging each of the first and second movable grippers comprising:

a bearing fitted to the base of each moveable gripper, and a round pin fitted to each bearing such that the pin is free to rotate, and the pin protrudes from the base of a moveable gripper and extends into the corresponding spiral lead, the pin bears against one perpendicular wall of the corresponding spiral lead, and a minimum clearance exists between the perpendicular wall of the corresponding spiral lead against which the pin does not bear, and the pin; and positioning means for positioning the platen, the means for rotating the platen, the first moveable gripper, the means for engaging the first moveable gripper, and a member against which the first moveable gripper acts to apply grasping force to said object being manipulated, such positioning means including a mounting surface for attaching the robotic end effector to the means for rotating the platen.

* * * * *